United States Patent
Sheng et al.

(10) Patent No.: US 10,003,718 B2
(45) Date of Patent: Jun. 19, 2018

(54) SCANNING DEVICE WITH OVERHEAD REFLECTING MIRROR

(71) Applicant: AVISION INC., Hsinchu (TW)

(72) Inventors: Thomas Sheng, Hsinchu (TW); Yen-Cheng Chen, Hsin Chu (TW)

(73) Assignee: Avision Inc. (TW)

( * ) Notice: Subject to any disclaimer, the term of this patent is extended or adjusted under 35 U.S.C. 154(b) by 0 days. days.

(21) Appl. No.: 14/961,381

(22) Filed: Dec. 7, 2015

(65) Prior Publication Data

US 2016/0173721 A1 Jun. 16, 2016

(30) Foreign Application Priority Data

Dec. 15, 2014 (TW) .............................. 103143612 A

(51) Int. Cl.
*H04N 1/38* (2006.01)
*H04N 1/00* (2006.01)
*H04N 1/10* (2006.01)

(52) U.S. Cl.
CPC ........... *H04N 1/38* (2013.01); *H04N 1/00018* (2013.01); *H04N 1/00037* (2013.01); *H04N 1/00084* (2013.01)

(58) Field of Classification Search
CPC ........ H04N 1/38; H04N 1/10; H04N 1/00037; H04N 1/0084; H04N 1/00018; H04N 2201/0081
See application file for complete search history.

(56) References Cited

U.S. PATENT DOCUMENTS

| 6,166,394 A | 12/2000 | Rubscha | |
|---|---|---|---|
| 6,233,065 B1* | 5/2001 | Lee | H04N 1/1017 358/474 |
| 6,259,100 B1* | 7/2001 | Cross | B65H 7/14 250/375 |
| 8,031,362 B2 | 10/2011 | Amada | |
| 2008/0279474 A1* | 11/2008 | Venable | G06T 5/005 382/275 |
| 2013/0148175 A1 | 6/2013 | Ho et al. | |
| 2014/0140744 A1* | 5/2014 | Akai | G03G 15/607 399/371 |
| 2014/0231002 A1* | 8/2014 | Patil | C01B 31/0453 156/247 |

FOREIGN PATENT DOCUMENTS

| CN | 1707306 A | 12/2005 |
|---|---|---|
| CN | 102710884 A | 10/2012 |
| TW | M370897 | 12/2009 |
| TW | 201325198 A | 6/2013 |

* cited by examiner

*Primary Examiner* — Iriana Cruz

(57) ABSTRACT

A scanning device comprises a light source, a reflecting mirror and a photosensor. The light source provides light to an original. A first portion of the light penetrates through a hole of the original and becomes penetrating light. A second portion of the light is reflected by a hole-free portion of the original and becomes second reflected light. The reflecting mirror reflects the penetrating light and generates first reflected light. The photosensor receives the first reflected light and the second reflected light and generates a hole-containing image signal representative of an image of the original.

16 Claims, 5 Drawing Sheets

SCANNING DEVICE WITH OVERHEAD REFLECTING MIRROR

This application claims priority of No. 103143612 filed in Taiwan R.O.C. on Dec. 15, 2014 under 35 USC 119, the entire content of which is hereby incorporated by reference.

BACKGROUND OF THE INVENTION

Field of the Invention

The present invention relates to a scanning device, and more particularly to a scanning device with an overhead reflecting mirror for facilitating image processing of removing a hole image of an original or a document being scanned.

Related Art

A conventional scanner can be used to scan a document with a hole or holes. However, after the visible light is incident to the hole, a visible light sensor of the scanner cannot receive the visible light from the hole. So, the scanned result is presented as a fully black image corresponding to the position of the hole. If the user prints the image, a lot of toners are wasted in printing the fully black hole image. Although the image processing software can be executed to remove the hole image, such the post-processing is not very precise and occupies a lot of performance because the image processing software cannot always correctly distinguish between the black block and the hole image. In addition, no all the scanners have the image processing software, and the scanner having the image processing software has the higher cost. In addition, the image processing procedure wastes a lot of time of the user, and is also a huge obstacle to users who are unfamiliar with the software operations.

SUMMARY OF THE INVENTION

Accordingly, the present invention has been proposed to solve the problems of the prior art, and an object of the present invention is to provide a scanning device with an overhead reflecting mirror for facilitating the image processing of removing a hole image or hole images from a scanned image obtained after a hole-containing document is scanned.

To achieve the above-identified object, the present invention provides a scanning device comprising a light source, a reflecting mirror and a photosensor. The light source provides light to an original. A first portion of the light penetrates through a hole of the original and becomes penetrating light, and a second portion of the light is reflected by a hole-free portion of the original and becomes second reflected light. The reflecting mirror reflects the penetrating light and generates first reflected light. The photosensor receives the first reflected light and the second reflected light and generates a hole-containing image signal representative of an image of the original.

With the above-mentioned overhead reflecting mirror for reflecting the light penetrating through the hole of the original to the photosensor, the sensing cell of the photosensor reaches a saturated state to obtain a saturated value, which is significantly higher than the sensing value of the photosensor obtained when the light is reflected by a standard white pattern to the photosensor. The position of the hole can be determined according to the determined position of the saturated value, and the hole inpainting procedure can be performed. Thus, it is unnecessary to perform the complicated image processing to estimate the position of the hole. In addition, the control processing module can immediately determine and inpaint the hole image on one scan section according to the saturated value. Consequently, it is unnecessary to use a large-capacity memory and buffer as well as a high-performance processor, and the cost of the system resource can be saved. Thus, the cost of the scanning device or peripheral can be effectively decreased, and the scanning device or peripheral can also directly process the image inpainting and then output the inpainted image to a computer device connected thereto.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to accompanying drawings.

Figure 1:
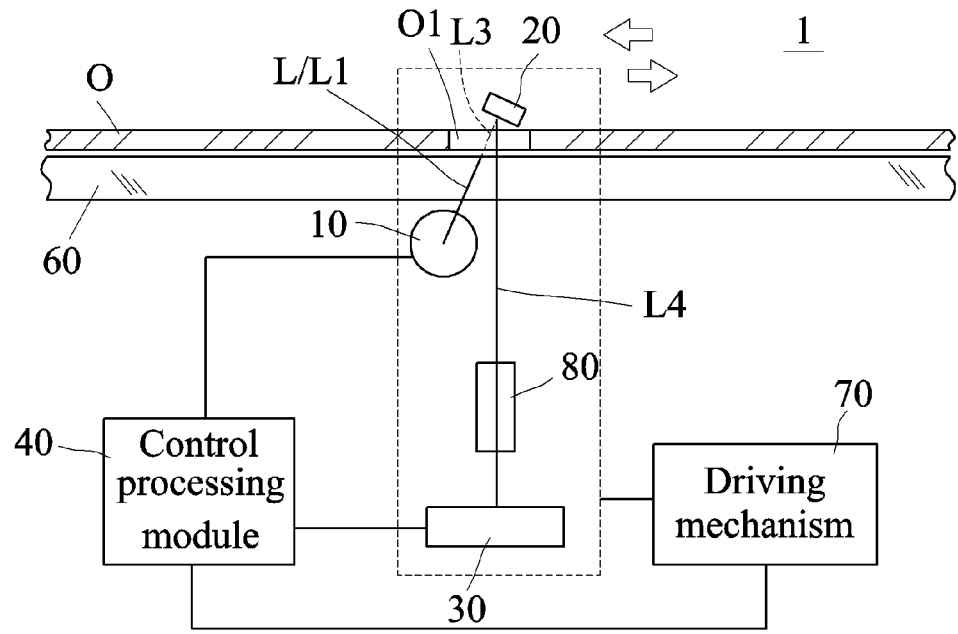
FIGS. 1 and 2 are schematic views showing two different states of a scanning device according to a first embodiment of the present invention.
Figure 2:
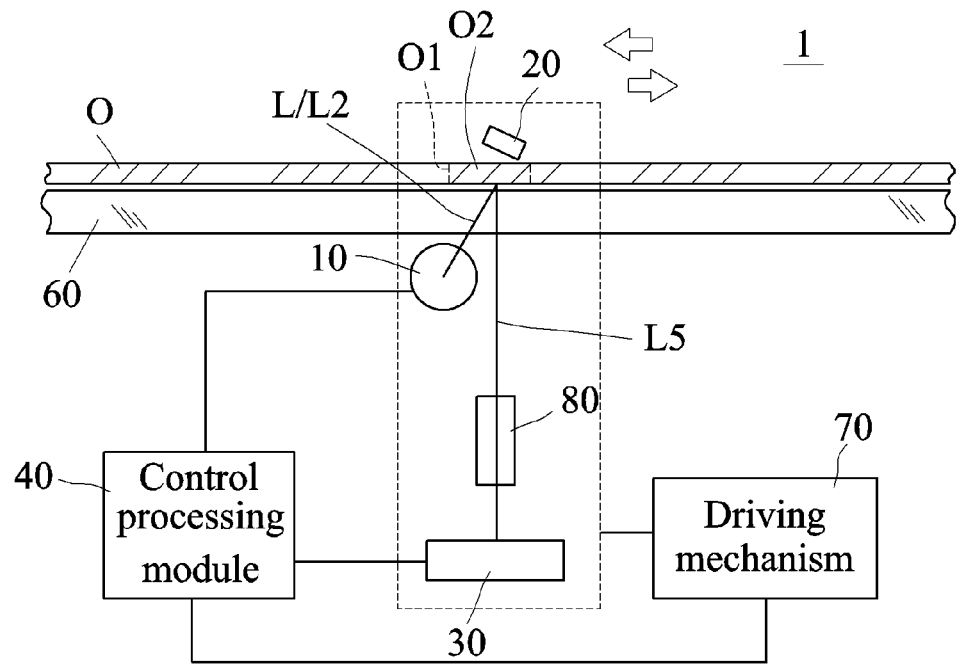
Figure 3:
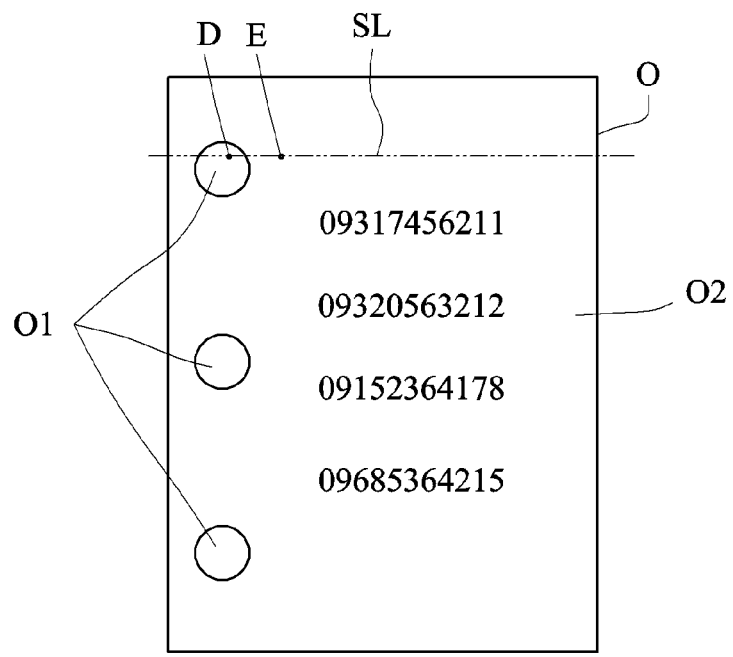
FIG. 3 is a schematic view showing an original.
Figure 4:
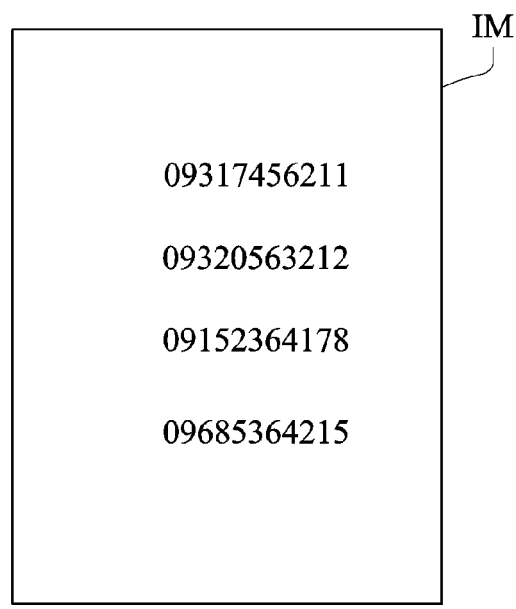
FIG. 4 is a schematic view showing a hole-free image representative of the original.

FIGS. 1 and 2 are schematic views showing two different states of a scanning device 1 according to a first embodiment of the present invention. FIG. 3 is a schematic view showing an original O. FIG. 4 is a schematic view showing a hole-free image representative of the original. The purpose of this embodiment is to scan the original O using the scanning device, and to process the image of the hole-containing original into the hole-free image using its own processing module or an externally connected processing module.

Referring to FIGS. 1 to 4, the scanning device 1 of this embodiment comprises a light source 10, a reflecting mirror 20 and a photosensor 30, all of which are disposed inside a housing (not shown) of the scanning device 1. In FIGS. 1 and 2, the light source 10, the reflecting mirror 20 and the photosensor 30 extend in a direction perpendicular to the plane of the drawing. That is, FIGS. 1 and 2 are partial cross-sections of the scanning device 1, wherein each partial cross-section corresponds to one scan line SL of the scanning device 1. The scan line SL is also referred to as a scan section, which represents the image of one line segment or section of the original O that can be captured by the photosensor 30 when a relative positional relationship between the original O and the photosensor 30 is fixed. In other words, FIG. 1 corresponds to the optical path at the point D of FIG. 3, and FIG. 2 corresponds to the optical path at the point E of FIG. 3.

Referring to FIG. 1, the light source 10 provides light L to the original O, and a first portion L1 of the light L penetrates through a hole O1 of the original O and becomes penetrating light L3. Referring again to FIG. 2, no hole is present at another position of the original O (e.g., the position on a plane parallel to the drawing of FIG. 1) at the same time, and a second portion L2 of the light L is reflected by a hole-free portion O2 of the original O and becomes second reflected light L5. In one example, the light L is visible light. In another example, the light L is infrared light. In still another example, the light L may be switched between the visible light and the infrared light to satisfy the requirements.

The reflecting mirror 20 reflects the penetrating light L3 and generates first reflected light L4. Because the reflecting mirror 20 is disposed above the original O, it is referred to as an overhead reflecting mirror.

The longitudinal photosensor 30 receives the first reflected light L4 and the second reflected light L5 and generates a hole-containing image signal representative of an image of the original O. The hole-containing image signal may be processed in the scanning device, or may be transmitted to another processing device or computer device and processed thereby. For example, the hole-containing image signal may be transmitted to a mobile phone through a wireless network, and the mobile phone performs image processing and the subsequent hole-removing process.

When the light source 10, the reflecting mirror 20 and the photosensor 30 are located at the position of FIGS. 1 and 2 to perform the scanning, the scan line SL is shown in FIG. 3, wherein a portion of the scan line SL runs across the hole O1 and is represented by an optical path corresponding to FIG. 1; and the other portion of the scan line SL runs across the hole-free portion O2 and is represented by an optical path corresponding to FIG. 2. Performing the following hole-removing process can obtain the original image IM shown in FIG. 4.

In this embodiment, the first sensing cells of the photosensor 30 receive the first reflected light L4 to obtain first sensing values reaching a saturated value. In other words, the exposure amount of the first sensing cell immediately reaches the saturated state. The second sensing cells of the photosensor 30 receive the second reflected light L5 to obtain second sensing values, none of which reach the saturated value. In other words, the second sensing values are much lower than the saturated value. For example, in the condition where the sensing values range from 0 to the saturated value 255, the second sensing values only can reach 95% to 75% (preferably 90% to 80%) of the saturated value.

For example, Table 1 shows an example of the first sensing values and the second sensing values of the first sensing cells C1 and the second sensing cells C2. As shown in Table 1, the second sensing values of the second sensing cells C2 corresponding to the hole reach the saturated value (255), and the maximum of the first sensing values of the first sensing cells C1 corresponding to the hole-free portion (the white portion of the original) only reaches 220 and never reaches the saturated value. This is because the light is reflected from the reflecting mirror to the photosensor, and the photosensor encounters the effect similar to the human's eye, which becomes blind upon receiving the glare. Thus, the position of the hole of the original can be easily determined. It is worth noting that Table 1 is only used for the purpose of the exemplified description, and that the number of the sensing values may be greater and the sensing values may be more diversified upon the practical application.

TABLE 1

| | C2 | C2 | C1 | C1 | C1 | C1 | C1 | C2 | C2 | C2 | C2 |
|---|---|---|---|---|---|---|---|---|---|---|---|
| Sensing value | 210 | 215 | 255 | 255 | 255 | 255 | 255 | 220 | 40 | 40 | 40 |

In order to remove the hole image from the scanned image in the scanning device, the scanning device 1 may further comprise a control processing module 40, which is electrically connected to the photosensor 30 and the light source 10, and performs a hole-removing process on the hole-containing image signal to obtain a hole-free image signal.

The hole-removing process may be performed in various ways. In one example, the control processing module 40 adjusts the first sensing values to a standard white value to complete the hole-removing process, wherein the standard white value is lower than the saturated value. For example, the first sensing values (255) are adjusted to (230). In another example, the control processing module 40 adjusts the first sensing values to a highest sensing value of the second sensing values to complete the hole-removing process. For example, the first sensing values (255) are adjusted to (220). In still another example, the control processing module 40 adjusts the first sensing values to an average of relatively high sensing values of the second sensing values to complete the hole-removing process. For example, the first sensing values (255) are adjusted to (220+215+210)/3.

In this embodiment, the scanning device 1 is a flatbed scanner and further comprises a platen 60, a driving mechanism 70 and a lens 80. The original O is placed on the platen 60. The driving mechanism 70 drives a combination of the light source 10, the reflecting mirror 20 and the photosensor 30 to move past the original O. The lens 80 is disposed on an optical path of the first reflected light L4 and the second reflected light L5, and focuses the first reflected light L4, which penetrates through the hole O1 of the original O, and the second reflected light L5 onto the photosensor 30. In this embodiment, the reflecting mirror 20 and the light source 10 are disposed on two opposite sides of the original O, respectively, and two opposite sides of the platen 60, respectively. In addition, the reflecting mirror 20 and the photosensor 30 are disposed on the two opposite sides of the original O, respectively. In this embodiment, the reflecting mirror 20 is slantingly disposed relative to the hole O1 of the original O when the first portion L1 of the light L penetrates through the hole O1, and when the first reflected light L4 penetrates through the hole O1.

Figure 5:
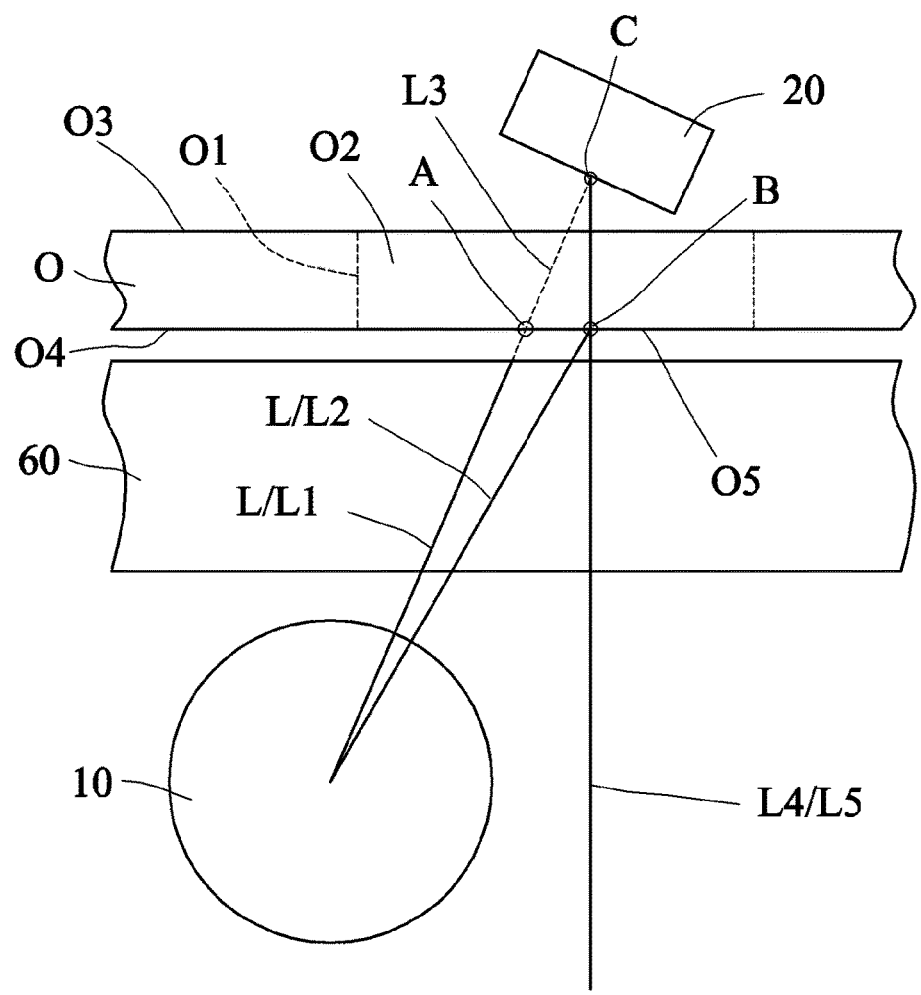
FIG. 5 is an enlarged partial view showing an optical path according to FIGS. 1 and 2.

FIG. 5 is an enlarged partial view showing an optical path according to FIGS. 1 and 2. Because a distance is present between the reflecting mirror 20 and the bottom of the original O, the position of the generated hole image is slightly offset. At this time, the offset (the length of the line segment AB) can be determined as a predetermined offset parameter according to the right triangle constituted by three points A, B and C on the optical path of FIG. 5, so that the control processing module 40 determines the position of the hole image in the hole-containing image signal according to the predetermined offset parameter, and the better compensation effect is achieved. As shown in FIG. 5, a straight line segment (may be regarded as being overlapped with the combination of L3 and L1 in FIG. 5) connecting the reflecting mirror 20 to the light source 10 intersects with two opposite surfaces O3 and O4 of the original O; a surface O5 of the hole-free portion O2 of the original O reflecting the second portion L2 of the light L is a portion of the surface O4 of the original O; and the hole O1 of the original O penetrates through the original O from the surface O4 to the surface O3. In addition, the original O or platen 60 separates the reflecting mirror 20 from the light source 10.

Figure 6:
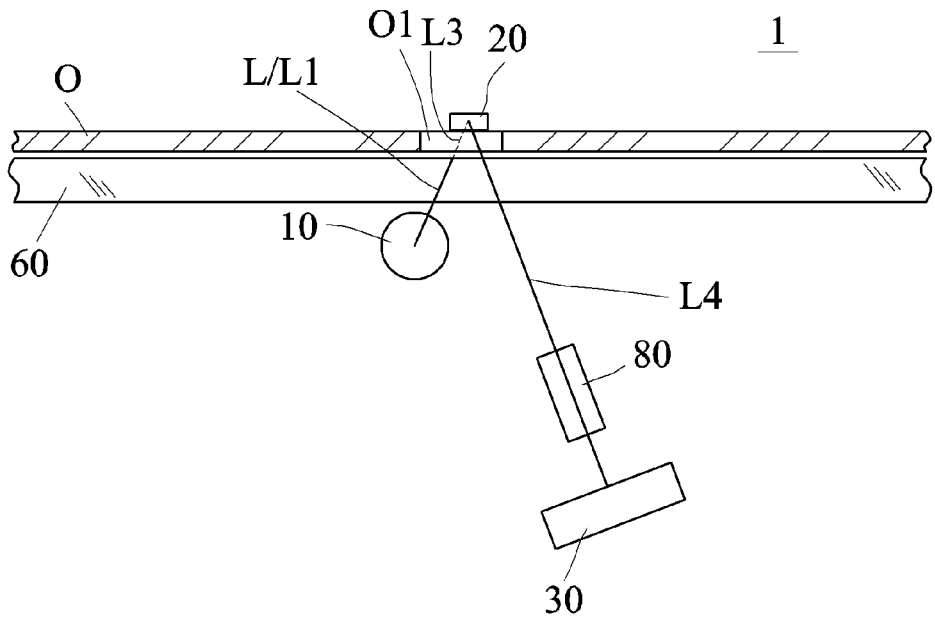
FIGS. 6 and 7 are schematic views showing two different states of a scanning device according to a second embodiment of the present invention.
Figure 7:
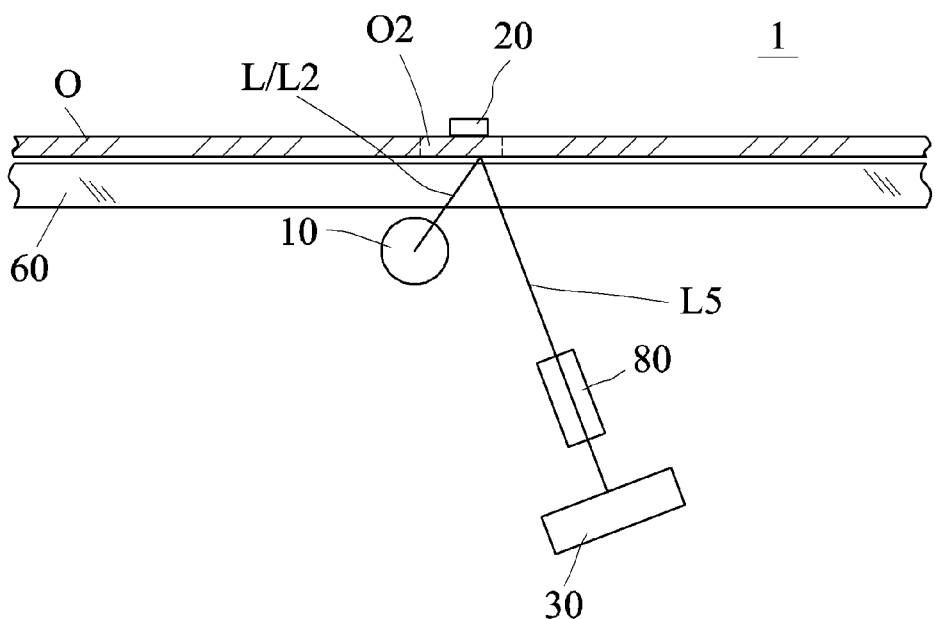

FIGS. 6 and 7 are schematic views showing two different states of a scanning device according to a second embodiment of the present invention. As shown in FIGS. 6 and 7, this embodiment is similar to the first embodiment except that the reflective surface of the reflecting mirror 20 is disposed horizontally (i.e., disposed in parallel to the platen 60), but the lens 80 and the photosensor 30 are disposed slantingly. This configuration still can achieve the effect of the present invention. It is worth noting that the entire background member of the upper cover of the flatbed scanning device can be configured as a large-area reflecting mirror. Consequently, the large-area reflecting mirror needs not to be movable, and the mechanism design can be simplified. In this embodiment, the reflecting mirror 20 is parallelly disposed relative to the hole O1 of the original O when the first portion L1 of the light L slantingly penetrates through the hole O1, and when the first reflected light L4 slantingly penetrates through the hole O1.

Figure 8:
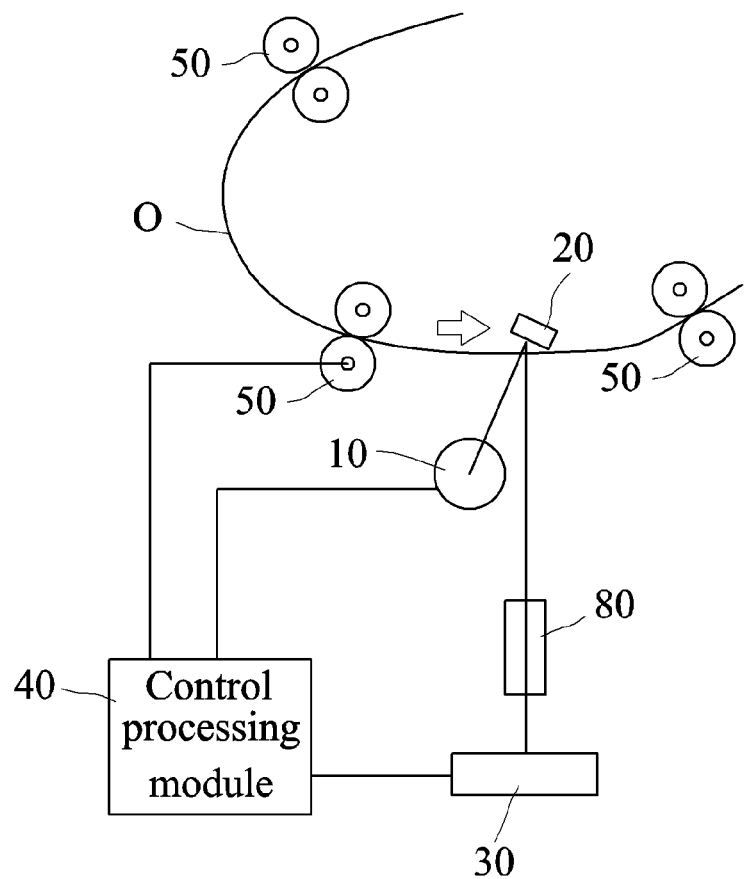
FIG. 8 is a schematic view showing a scanning device according to a third embodiment of the present invention.

FIG. 8 is a schematic view showing a scanning device according to a third embodiment of the present invention. Referring to FIG. 8, this embodiment is similar to the first embodiment except that the scanning device is a sheet-fed scanner and further comprises a transporting mechanism 50 implemented by several rollers herein. The light source 10, the reflecting mirror 20 and the photosensor 30 are configured to be stationary, and the transporting mechanism 50 transports the original O past the combination of the light source 10, the reflecting mirror 20 and the photosensor 30.

Figure 9:
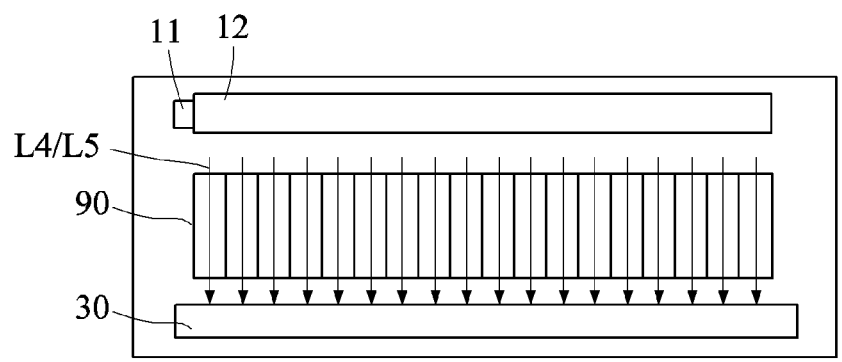
FIG. 9 is a schematic view showing a scanning device according to a fourth embodiment of the present invention.

FIG. 9 is a schematic view showing a scanning device according to a fourth embodiment of the present invention. Referring to FIG. 9, the scanning device 1 further comprises a lens array 90 disposed on an optical path of the first reflected light L4 and the second reflected light L5. The lens array 90 focuses the first reflected light L4 and the second reflected light L5 onto the photosensor 30, wherein the light source 10, the lens array 90 and the photosensor 30 constitute a contact image sensor (CIS). The light source 10 comprises a light-emitting diode 11 and a light guide 12 for providing a linear light source. The lens array 90 is composed of rod lenses. It is worth noting that the charge-coupled device (CCD) type image sensor scanning module constituted by the lens 80, the photosensor 30 and the light source 10 of the first embodiment may also be applied to the third embodiment.

In order to make the corresponding sensing cells reach the saturated value when the scanning device 1 scans the hole, the control processing module 40 may perform a calibration procedure to obtain a calibrated result. That is, a pre-scan step is performed after the user removes the original to obtain the sensing values of all sensing cells. When no original is present, the portion scanned by the scanning device is equivalent to a large hole. In this case, if not all the sensing cells reach the saturated value, then the control processing module 40 can adjust the luminance of the light source according to the calibrated result. For example, the power supply parameter (e.g., voltage, current or frequency) of the light source 10 can be adjusted to increase the luminance of the light outputted from the light source 10 to ensure that the subsequent first sensing values can reach the saturated value. Such the implementation can particularly solve the problem that the light source 10 encounters the light fading to disable the sensing cells from reaching the saturated state after being used for a period of time. The calibration timing can be determined by the control processing module 40. For example, the calibration is performed when the scanning device is turned on. Alternatively, the control processing module 40 calculates the usage time of the scanning device, and performs the calibration procedure when the accumulated time reaches a predetermined period of time (e.g., 1,000 or 2,000 hours). In another example, the control processing module 40 performs the calibration procedure when all the sensing cells cannot reach the saturated value within a period of time (e.g., 1,000 or 2,000 hours), thereby providing a smart judging function. Alternatively, when the user finds that the scanning device losses the hole inpainting function, the user inputs a command to request the control processing module 40 to perform the calibration procedure through a button, buttons or other methods.

With the above-mentioned overhead reflecting mirror for reflecting the light in each embodiment mentioned hereinabvoe, penetrating through the hole of the original, to the photosensor, the sensing cell of the photosensor reaches a saturated state to obtain a saturated value, which is significantly higher than the sensing value of the photosensor obtained when the light is reflected by a standard white pattern to the photosensor. The position of the hole can be determined according to the determined position of the saturated value, and the hole inpainting procedure can be performed. Thus, it is unnecessary to perform the complicated image processing to estimate the position of the hole. In addition, the control processing module can immediately determine and inpaint the hole image on one scan section according to the saturated value. Consequently, it is unnecessary to use a large-capacity memory and buffer as well as a high-performance processor, and the cost of the system resource can be saved. Thus, the cost of the scanning device or peripheral can be effectively decreased, and the scanning device or peripheral can also directly process the image inpainting and then output the inpainted image to a computer device connected thereto.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A scanning device, comprising:
   a light source providing light to an original, wherein a first portion of the light penetrates through a hole of the original and becomes penetrating light, and a second portion of the light is reflected by a hole-free portion of the original and becomes second reflected light;
   a reflecting mirror reflecting the penetrating light and generating first reflected light penetrating through the hole of the original; and
   a photosensor receiving the first reflected light penetrating through the hole of the original and the second reflected light and generating a hole-containing image signal representative of an image of the original, wherein the reflecting mirror and the light source are disposed on two opposite sides of the original, respectively, the reflecting mirror and the photosensor are disposed on the two opposite sides of the original, respectively, and a straight line segment connecting the reflecting mirror to the light source intersects with two opposite surfaces of the original, wherein the reflecting mirror is slantingly disposed relative to the hole of the original when the first portion of the light penetrates through the hole, and when the first reflected light penetrates through the hole.

2. The scanning device according to claim 1, wherein first sensing cells of the photosensor receive the first reflected light to obtain first sensing values, the first sensing values reach a saturated value, second sensing cells of the photosensor receive the second reflected light to obtain second sensing values, and none of the second sensing values reach the saturated value.

3. The scanning device according to claim 2, further comprising:
a control processing module, which is electrically connected to the photosensor and the light source and performs a hole-removing process on the hole-containing image signal to obtain a hole-free image signal.

4. The scanning device according to claim 3, wherein the control processing module adjusts the first sensing values to a standard white value lower than the saturated value to complete the hole-removing process.

5. The scanning device according to claim 3, wherein the control processing module adjusts the first sensing values to a highest sensing value of the second sensing values to complete the hole-removing process.

6. The scanning device according to claim 3, wherein the control processing module adjusts the first sensing values to an average of relatively high sensing values of the second sensing values to complete the hole-removing process.

7. The scanning device according to claim 3, wherein the control processing module determines a position of a hole image in the hole-containing image signal according to a predetermined offset parameter.

8. The scanning device according to claim 3, wherein the control processing module performs a calibration procedure to obtain a calibrated result, and adjusts a luminance of the light source according to the calibrated result to ensure that the subsequent first sensing values reach the saturated value.

9. The scanning device according to claim 1 being a sheet-fed scanner, wherein the scanning device further comprises:
a transporting mechanism, wherein the light source, the reflecting mirror and the photosensor are configured to be stationary, and the transporting mechanism transports the original past a combination of the light source, the reflecting mirror and the photosensor.

10. The scanning device according to claim 1 being a flatbed scanner, wherein the scanning device further comprises:
a platen, on which the original is placed; and
a driving mechanism driving a combination of the light source, the reflecting mirror and the photosensor past the original.

11. The scanning device according to claim 10, wherein the reflecting mirror and the light source are disposed on two opposite sides of the platen, respectively.

12. The scanning device according to claim 10, wherein the platen separates the reflecting mirror from the light source.

13. The scanning device according to claim 1, wherein a surface of the hole-free portion of the original reflecting the second portion of the light is a portion of one of the two opposite surfaces of the original.

14. The scanning device according to claim 1, wherein the hole of the original penetrates through the original from one of the two opposite surfaces of the original to the other of the two opposite surfaces of the original.

15. A scanning device, comprising:
a light source providing light to an original, wherein a first portion of the light penetrates through a hole of the original and becomes penetrating light, and a second portion of the light is reflected by a hole-free portion of the original and becomes second reflected light;
a reflecting mirror reflecting the penetrating light and generating first reflected light penetrating through the hole of the original; and
a photosensor receiving the first reflected light penetrating through the hole of the original and the second reflected light and generating a hole-containing image signal representative of an image of the original, wherein the reflecting mirror and the light source are disposed on two opposite sides of the original, respectively, the reflecting mirror and the photosensor are disposed on the two opposite sides of the original, respectively, and the original separates the reflecting mirror from the light source,
wherein the reflecting mirror is slantingly disposed relative to the hole of the original when the first portion of the light penetrates through the hole, and when the first reflected light penetrates through the hole.

16. A scanning device, comprising:
a light source providing light to an original, wherein a first portion of the light penetrates through a hole of the original and becomes penetrating light, and a second portion of the light is reflected by a hole-free portion of the original and becomes second reflected light;
a reflecting mirror reflecting the penetrating light and generating first reflected light penetrating through the hole of the original; and
a photosensor receiving the first reflected light penetrating through the hole of the original and the second reflected light and generating a hole-containing image signal representative of an image of the original, wherein the reflecting mirror and the light source are disposed on two opposite sides of the original, respectively, the reflecting mirror and the photosensor are disposed on the two opposite sides of the original, respectively, and a straight line segment connecting the reflecting mirror to the light source intersects with two opposite surfaces of the original,
wherein the reflecting mirror is parallelly disposed relative to the hole of the original when the first portion of the light slantingly penetrates through the hole, and when the first reflected light slantingly penetrates through the hole, and
wherein first sensing cells of the photosensor receive the first reflected light from the reflecting mirror to obtain first sensing values, the first sensing values reach a saturated value, second sensing cells of the photosensor receive the second reflected light to obtain second sensing values, and none of the second sensing values reach the saturated value.

* * * * *